Nov. 4, 1941.                    T. A. MANLEY                    2,261,692
                     PROTECTING DEVICE FOR AUTOMOBILE MIRRORS
                              Filed Oct. 13, 1939
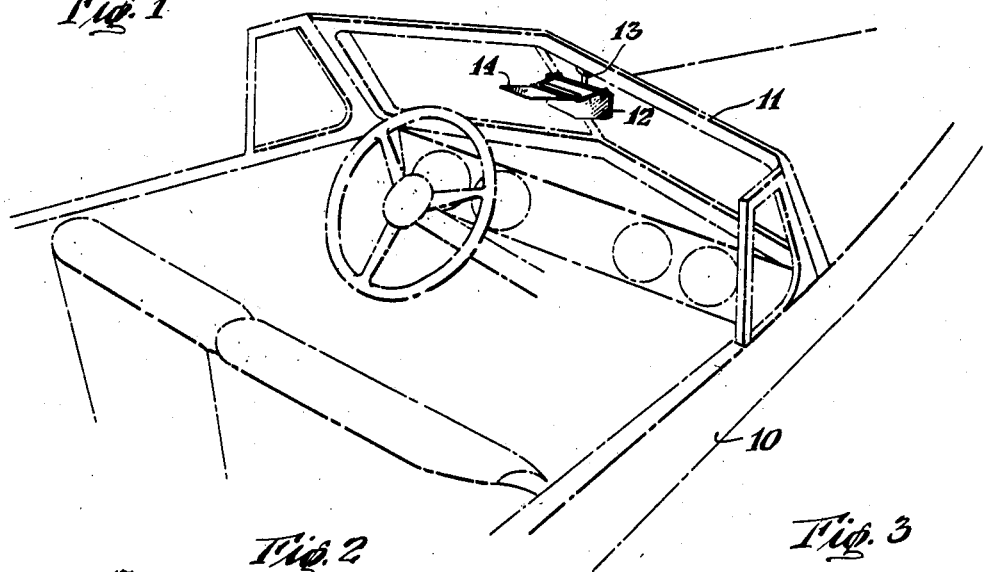
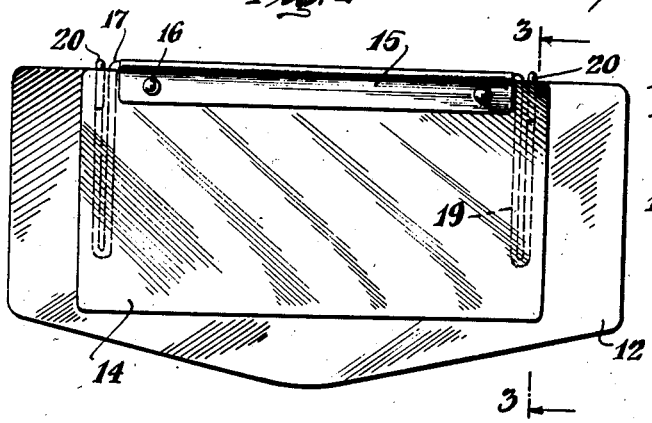
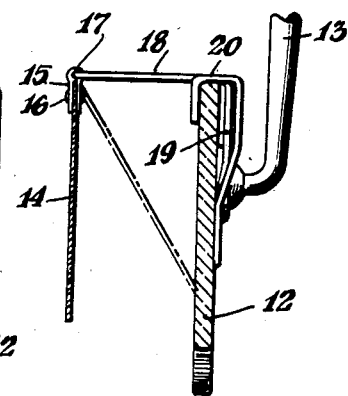
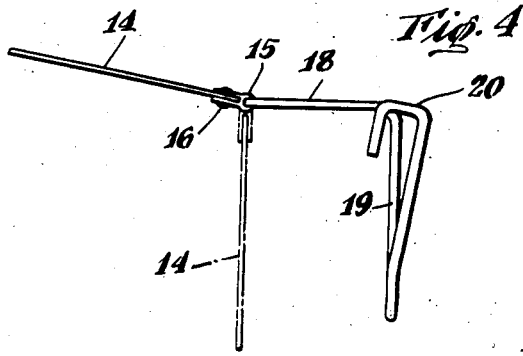
INVENTOR
Thomas A. Manley
BY
ATTORNEY

UNITED STATES PATENT OFFICE 2,261,692

PROTECTING DEVICE FOR AUTOMOBILE MIRRORS

Thomas A. Manley, Columbus, Wis.

Application October 13, 1939, Serial No. 299,237

1 Claim. (Cl. 88—77)

This invention relates to improvements in the protecting devices for the eyes of automobile drivers to protect the same against the glare of the sun beams striking the rear view mirrors giving the driver a clear view of the conditions of the road in the rear of his car, and thus greatly contributing to the safety of operating a car.

It is the principal object of my invention to provide a shield of simple and inexpensive construction which however is durable and highly efficient in use, and can readily be placed in front of a mirror or spyglass attached to any part of a car giving its driver a view of traffic approaching from the rear, on account of its angular position to the mirror.

Another object of my invention is the provision of a translucent glareshield for automobile mirrors which can be preferably made from inexpensive green Celluloid or material of any other suitable consistency and color.

A further object of my invention is the provision of a glareshield for the mirrors on automobiles or the like vehicles which is equipped with a suitable frame for suspension from a mirror or removal therefrom.

These and other objects and advantages of my invention will become more fully known as the description thereof proceeds, and will then be specifically defined in the appended claim.

In the accompanying drawing forming a material part of this disclosure:

Fig. 1 is a fragmentary perspective view of the front part of an automobile, the rear view mirror of which is equipped with an anti-glare shield constructed according to my invention.

Fig. 2 is a front elevational view of a glareshield in front of a mirror on a somewhat enlarged scale.

Fig. 3 is a section on line 3—3 of Figure 2.

Fig. 4 is a detail view of the shield frame and hanger.

As illustrated, an automobile 10 of any standard type, equipped with a windshield 11 has attached thereto the customary rear view mirror 12 by any well known means 13. The anti-glare shield according to my invention is represented by a plate 14, preferably of green Celluloid-the upper edge of which is adjustably held in a frame 15 secured thereto by means of studs 16 or the like. Through this frame extends longitudinally a movable bar or rod 17 having outwardly and downwardly extending lateral branches 18, 19 and upwardly directed hooks 20 adapted to grip across the upper edge of the mirror.

The use of the anti-glare shield according to my invention will be entirely clear from the above description by simultaneous inspection of the drawing, and it will be evident, that the shield when suspended by the hooks from the upper edge of a mirror will effectively protect the eyes of the car operator from any glare caused either by the rays of the sun or by the light rays of the headlights of a car approaching from the rear, and thus my device will contribute greatly to the safe operation of an automobile on the road and prevent loss of life and injury to the driver and other occupants of a car and damage to the machine. It will be clear that the shield will be held at an angle to the mirror while driving.

It will be understood that I have described and shown the preferred form of my invention only as one example of the many possible ways to practically construct the same, and that I may make such changes in the general arrangement of the invention and the construction of its minor parts as come within the scope of the appended claim without departure from the spirit of my invention and the principles involved.

Having thus described my invention, what I claim as new and desire to secure by Letters Patent is:

A means for removably suspending an antiglare shield for the mirrors of cars at any desired angle thereto, said means comprising, a frame secured by studs to the upper edge of said shield and having a tubular member formed integrally with the upper edge of said frame projecting beyond said shield, a rod extending longitudinally through said tubular member and movably arranged therein, outwardly and laterally extending branches formed with said rod having re-entrantly bent, upwardly directed ends and hooks formed by said ends to grip across the upper edge of a mirror.

THOMAS A. MANLEY.